UNITED STATES PATENT OFFICE.

GEORGE BEHRENS, OF BRUNSWICK, MISSOURI.

IMPROVEMENT IN MEDICAL COMPOUNDS FOR CURE OF FEVER AND AGUE.

Specification forming part of Letters Patent No. 131,078, dated September 3, 1872.

*To all whom it may concern:*

Be it known that I, GEORGE BEHRENS, of Brunswick, in the county of Chariton and State of Missouri, have invented a new and valuable Improvement in Medical Compounds; and I do hereby declare that the following is a full, clear, and exact description of the construction and operation of the same.

My invention has relation to a new medical compound for the cure of fever and ague and other diseases, and consists of the following ingredients compounded in the proportions and manner hereinafter specified.

Take smilax officinalis, one pound; laurus sassafras, one pound; juniperus communis, one pound; glycyrrhiza echinata, one pound; coriandrum sativum, six ounces; cassia medicinalis, twelve ounces; radix verbena urticifolia, (Behrensii,) one pound. Boil, with six gallons of water, down to half the quantity, and, after straining, add three quarts of alcohol. The compound is then ready for use, and is to be taken internally in proper doses, for the cure of fever and ague and other diseases for which quinine is generally used as a specific. The most essential ingredient of the above compound is the "radix verbena urticifolia, (Behrensii,)" which is believed to be more effective than quinine.

What I claim as new is—

The medical compound prepared from the ingredients named, and in the manner and proportions substantially as specified.

In testimony that I claim the above I have hereunto subscribed my name in the presence of witnesses.

GEORGE BEHRENS.

Witnesses:
  LOUIS BENECKE,
  M. C. TREW,
  JOHN COX.